(12) United States Patent
Huang et al.

(10) Patent No.: US 11,385,505 B2
(45) Date of Patent: Jul. 12, 2022

(54) DISPLAY SUBSTRATE, DISPLAY PANEL AND MANUFACTURING METHOD THEREOF, DISPLAY DEVICE

(71) Applicant: BOE TECHNOLOGY GROUP CO., LTD., Beijing (CN)

(72) Inventors: Hua Huang, Beijing (CN); Xin Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/976,543

(22) PCT Filed: Nov. 29, 2019

(86) PCT No.: PCT/CN2019/122050
§ 371 (c)(1),
(2) Date: Aug. 28, 2020

(87) PCT Pub. No.: WO2021/102937
PCT Pub. Date: Jun. 3, 2021

(65) Prior Publication Data
US 2021/0165286 A1    Jun. 3, 2021

(51) Int. Cl.
*G02F 1/1337* (2006.01)
*G02F 1/1335* (2006.01)

(52) U.S. Cl.
CPC .. *G02F 1/133788* (2013.01); *G02F 1/133528* (2013.01); *G02F 1/133723* (2013.01); *G02F 1/133548* (2021.01)

(58) Field of Classification Search
None
See application file for complete search history.

(56) References Cited

U.S. PATENT DOCUMENTS 6,211,928 B1 * 4/2001 Oh ............... H01L 29/78636
349/43
2006/0109397 A1   5/2006 Anandan
(Continued)

FOREIGN PATENT DOCUMENTS

CN    105785638 A    7/2016
CN    108333825 A    7/2018
(Continued)

*Primary Examiner* — Ryan Crockett
(74) *Attorney, Agent, or Firm* — Dilworth & Barrese, LLP.; Michael J. Musella, Esq.

(57) ABSTRACT

A display substrate, a display panel and a manufacturing method thereof, and a display device are disclosed. The display panel includes a first display substrate, a second display substrate and a third display substrate; the second display substrate is assembled with the first display substrate to form a first liquid crystal cell; the third display substrate is assembled with the second display substrate to form a second liquid crystal cell. In the display panel, a first alignment layer is located at a side of a second display substrate facing the first display substrate, the second alignment layer is located at a side of the second display substrate facing the third display substrate; the second alignment layer includes a metal wire grid polarizer and a buffer layer located on a surface of the metal wire grid polarizer facing the third display substrate.

19 Claims, 4 Drawing Sheets

(56) References Cited

U.S. PATENT DOCUMENTS

| | | | |
|---|---|---|---|
| 2007/0279562 A1* | 12/2007 | Rho | G02F 1/1337 349/130 |
| 2009/0128893 A1* | 5/2009 | McCarthy | G02B 5/1861 359/352 |
| 2018/0101067 A1 | 4/2018 | Chen et al. | |
| 2018/0106937 A1* | 4/2018 | Chen | B29C 59/022 |
| 2018/0348581 A1* | 12/2018 | Abe | H01L 27/1262 |
| 2019/0137817 A1* | 5/2019 | Yasui | G02F 1/133528 |

FOREIGN PATENT DOCUMENTS

| | | | |
|---|---|---|---|
| CN | 108957841 A | | 12/2018 |
| CN | 108983515 A | * | 12/2018 |

* cited by examiner

DISPLAY SUBSTRATE, DISPLAY PANEL AND MANUFACTURING METHOD THEREOF, DISPLAY DEVICE

TECHNICAL FIELD

Embodiments of the present disclosure relate to a display substrate, a display panel and a manufacturing method thereof, and a display device.

BACKGROUND

With the continuous development of display technologies, liquid crystal display technology has become mainstreamed. Usually, a liquid crystal display device includes a liquid crystal display panel and a backlight module; the liquid crystal display panel includes an array substrate and an opposed substrate which are cell-assembled, and a liquid crystal layer between the opposed substrate and the array substrate; the backlight module can provide the display panel with backlight; the liquid crystal display panel controls liquid crystal molecules in the liquid crystal layer to rotate through an electric field of the array substrate and the opposed substrate, so as to achieve the function of light valve and to modulate the backlight emitted from the backlight module, thereby achieving a grayscale display. On the other hand, the opposed substrate can be provided with color filters so that the liquid crystal display device can achieve a colored display.

SUMMARY

Embodiments of the present disclosure provide a display substrate, a display panel and a manufacturing method thereof, and a display device. The display panel includes a first display substrate; a second display substrate, the second display substrate being assembled with the first display substrate to form a first liquid crystal cell; a third display substrate located at a side of the second display substrate away from the first display substrate, the third display substrate being assembled with the second display substrate to form a second liquid crystal cell; and a first alignment layer, located at a side of the second display substrate facing the first display substrate, the display panel further includes a second alignment layer located at a side of the second display substrate facing the third display substrate; the second alignment layer includes a metal wire grid polarizer and a buffer layer located on a surface of the metal wire grid polarizer facing the third display substrate. The second alignment layer above can be fabricated under a low temperature condition so that the display panel has a high light transmittance.

At least one embodiment of the present disclosure provides a display panel, which includes: a first display substrate; a second display substrate, the second display substrate being assembled with the first display substrate to form a first liquid crystal cell; a third display substrate located at a side of the second display substrate away from the first display substrate, the third display substrate being assembled with the second display substrate to form a second liquid crystal cell; and a first alignment layer, located at a side of the second display substrate facing the first display substrate, the display panel further includes a second alignment layer located at a side of the second display substrate facing the third display substrate; the second alignment layer includes a metal wire grid polarizer and a buffer layer located on a surface of the metal wire grid polarizer facing the third display substrate.

For example, in the display panel provided by an embodiment of the present disclosure, the buffer layer includes a silicon oxide layer or a first photopolymer alignment layer.

For example, in the display panel provided by an embodiment of the present disclosure, the first liquid crystal cell includes a first liquid crystal layer located between the first display substrate and the second display substrate, the second liquid crystal cell includes a second liquid crystal layer located between the second display substrate and the third display substrate, and the buffer layer is arranged to be in contact with the second liquid crystal layer.

For example, in the display panel provided by an embodiment of the present disclosure, the buffer layer includes a silicon oxide layer, and a thickness of the silicon oxide layer is in a range of 200 nm-600 nm.

For example, in the display panel provided by an embodiment of the present disclosure, the buffer layer includes a silicon oxide layer, and a surface of the silicon oxide layer away from the metal wire grid polarizer includes a plurality of micro grooves arranged in parallel with each other.

For example, in the display panel provided by an embodiment of the present disclosure, the display panel further includes: a third alignment layer, located at a side of the third display substrate facing the second display substrate; and a fourth alignment layer, located at a side of the first display substrate facing the second display substrate, each of the first alignment layer, the third alignment layer and the fourth alignment layer is a polyimide (PI) alignment layer.

For example, in the display panel provided by an embodiment of the present disclosure, the second alignment layer includes a first photopolymer alignment layer, the display panel further includes a second photopolymer alignment layer located at a side of the third display substrate facing the second display substrate, and the first photopolymer alignment layer and the second photopolymer alignment layer both are formed by polymerizing an orientation monomer through light irradiation.

For example, in the display panel provided by an embodiment of the present disclosure, the first liquid crystal cell includes a first liquid crystal layer located between the first display substrate and the second display substrate, the second liquid crystal cell includes a second liquid crystal layer located between the second display substrate and the third display substrate, and the second liquid crystal layer includes a self-orientated liquid crystal material.

For example, in the display panel provided by an embodiment of the present disclosure, the self-orientated liquid crystal material includes a liquid crystal molecule and an orientation monomer.

For example, in the display panel provided by an embodiment of the present disclosure, the display panel further includes: a fourth alignment layer, located at a side of the first display substrate facing the second display substrate; and a fifth alignment layer, located between the second photopolymer alignment layer and the third display substrate, each of the first alignment layer, the third alignment layer and the fifth alignment layer is a polyimide (PI) alignment layer.

For example, in the display panel provided by an embodiment of the present disclosure, the first liquid crystal cell is a display liquid crystal cell, and the second liquid crystal cell is a dimming liquid crystal cell.

At least one embodiment of the present disclosure provides a display device, including any one of the abovementioned display panel.

At least one embodiment of the present disclosure provides a manufacturing method of a display panel, including: assembling a first display substrate with a second display substrate to form a first liquid crystal cell; and assembling the second display substrate with a third display substrate to form a second liquid crystal cell, the manufacturing method of the display panel further includes: forming a first alignment layer at a side of the second display substrate facing the first display substrate; and forming a second alignment layer at a side of the second display substrate facing the third display substrate, the second alignment layer includes a metal wire grid polarizer and a buffer layer located on a surface of the metal wire grid polarizer facing the third display substrate.

For example, in the manufacturing method provided by an embodiment of the present disclosure, forming the second alignment layer at the side of the second display substrate facing the third display substrate includes: after assembling the first display substrate with the second display substrate to form the first liquid crystal cell, forming the metal wire grid polarizer at a side of the second display substrate away from the first display substrate; and forming a silicon oxide layer at a side of the metal wire grid polarizer away from the first display substrate, the silicon oxide layer being the buffer layer.

For example, in the manufacturing method provided by an embodiment of the present disclosure, forming the metal wire grid polarizer at the side of the second display substrate away from the first display substrate and forming the silicon oxide layer at the side of the metal wire grid polarizer away from the first display substrate are performed at a fabrication temperature below 120 centigrade degrees.

For example, in the manufacturing method provided by an embodiment of the present disclosure, assembling the first display substrate with the second display substrate to form the first liquid crystal cell includes: forming a first liquid crystal layer between the first display substrate and the second display substrate, assembling the second display substrate with the third display substrate to form the second liquid crystal cell includes: forming a second liquid crystal layer between the second display substrate and the third display substrate, the buffer layer and the second liquid crystal layer are arranged to be in contact with each other.

For example, in the manufacturing method provided by an embodiment of the present disclosure, assembling the second display substrate with the third display substrate to form the second liquid crystal cell includes: assembling the second display substrate with the third display substrate to form a cell; injecting a self-orientated liquid crystal material between the second display substrate and the third display substrate; and irradiating the second liquid crystal cell by using first ultraviolet (UV) light to allow an orientation monomer in the self-orientated liquid crystal material to form a first photopolymer alignment layer at a side of the second display substrate facing the third display substrate, and to form a second photopolymer alignment layer at a side of the third display substrate facing the second display substrate, the first photopolymer alignment layer is the buffer layer.

For example, the manufacturing method provided by an embodiment of the present disclosure, further including: before irradiating the self-orientated liquid crystal material by using the first ultraviolet light, heating the self-orientated liquid crystal material to make a temperature of the self-orientated liquid crystal material higher than a clearing point of the self-orientated liquid crystal material by more than 10 centigrade degrees.

For example, the manufacturing method provided by an embodiment of the present disclosure further including: irradiating the second liquid crystal cell by using second ultraviolet light so as to completely remove the orientation monomer remained in the second liquid crystal cell.

At least one embodiment of the present disclosure provides a display substrate, including: a base substrate, having a first side and a second side opposite to each other; a first alignment layer, located at the first side of the base substrate; and a second alignment layer, located at the second side of the base substrate, the second alignment layer includes a metal wire grid polarizer and a buffer layer located on a surface of the metal wire grid polarizer away from the base substrate, the buffer layer includes a silicon oxide layer or a photopolymer alignment layer.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
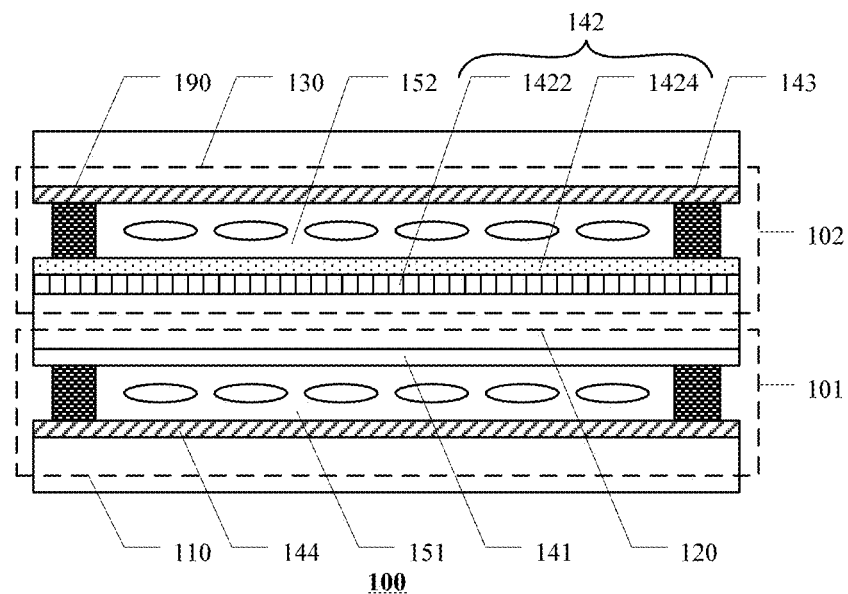
FIG. 1 is a structural diagram of a display panel provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly.

With the continuous development of display technologies, people have increasingly higher requirements on the display quality of large-sized display devices (e.g., TV products), resulting in that the competition of large-sized display devices is also more and more intense. However, due to the influence to the scattering of light caused by liquid crystal alignment, liquid crystal material and other materials, the conventional liquid crystal display device is difficult to achieve a high contrast.

In order to improve the contrast of the liquid crystal display device, usually, it can regionally control the backlight emitted from the backlight module and dynamically adjust an intensity of the backlight in different regions depending on grayscale demands of the displayed image, so as to achieve high dynamic contrast (HDR). Such backlight module capable of dynamic dimming can be classified into side-lit backlight module and direct-lit backlight module; the side-lit backlight module can only be regionally controlled in a row direction or column direction, that is to say, it can only achieve one-dimensional dynamic dimming, which results in poor effect of dynamic contrast. While the direct-lit backlight module can achieve two-dimensional dynamic dimming through light-emitting elements arranged in a matrix; however, in order to avoid an occurrence of Mura defect, a mixed light distance from the light-emitting element to the display panel needs to be set longer, which leads to a larger thickness of the backlight module and a difficulty in achieving a lighter and thinner design.

In order to improve the contrast of the liquid crystal display device and to achieve a lighter and thinner design at the same time, the liquid crystal display device can adopt a dual-liquid crystal cell structure, in which one liquid crystal cell is configured to regionally and dynamically adjust the backlight and the other liquid crystal cell is configured to normally display an image. The liquid crystal display device adopting a dual-liquid crystal cell structure can achieve a pixel-based, regional and dynamic adjustment by regionally and dynamically adjust the backlight through the liquid crystal cells, thereby achieving an extremely high dynamic contrast. However, two liquid crystal cells usually include four display substrates, thus a stack of two liquid crystal cells is liable to result in poor light transmittance which degrades an overall luminous efficiency of the liquid crystal display device.

In this regard, the liquid crystal display device adopting a dual-liquid crystal cell structure can allow two liquid crystal cells to share one display substrate so as to reduce the number of the display substrates, thereby improving the light transmittance of the liquid crystal display device. In a manufacturing process of a dual-liquid crystal cell structure including three display substrates, it usually needs to assemble a first display substrate with a second display substrate to form a liquid crystal cell, then form an alignment layer on the liquid crystal cell, and finally assemble the liquid crystal cell with a third display substrate to constitute a duel-liquid crystal cell structure. However, currently, the matured alignment process for fabricating an alignment layer is to adopt polyimide (PI) as the alignment material and to complete a film formation by a curing process for about 30 minutes at a high temperature of 230 centigrade degrees, and a maximum temperature tolerable by the liquid crystal cell is 120 centigrade degrees. Therefore, how to achieve fabricating an alignment layer on a liquid crystal cell under a low temperature condition (below 120 centigrade degrees) is one of key points for achieving a dual-liquid crystal cell structure including three display substrates.

Consequently, embodiments of the present disclosure provide a display substrate, a display panel and a manufacturing method thereof, and a display device. The display panel includes: a first display substrate, a second display substrate and a third display substrate; the second display substrate is assembled with the first display substrate to form a first liquid crystal cell; the third display substrate is located at a side of the second display substrate away from the first display substrate, and the third display substrate is assembled with the second display substrate to form a second liquid crystal cell. The display panel further includes a first alignment layer and a second alignment layer, the first alignment layer is located at a side of the second display substrate facing the first display substrate, the second alignment layer is located at a side of the second display substrate facing the third display substrate; the second alignment layer includes a metal wire grid polarizer and a buffer layer located on a surface of the metal wire grid polarizer facing the third display substrate. In the case where the second alignment layer includes a metal wire grid polarizer and a buffer layer located on a surface of the metal wire grid polarizer facing the third display substrate, on the one hand, the metal wire grid polarizer can play a role of a polarizer, and on the other hand, the metal wire grid polarizer itself has a Nano-micro periodic structure so that the buffer layer formed on the surface of the metal wire grid polarizer facing the third display substrate also has a Nano-microgroove with a corresponding dimension; in this way, the second alignment layer constituted by the metal wire grid polarizer and the buffer layer can serve to align the liquid crystal molecules; because both the metal wire grid polarizer and the buffer layer can be fabricated by a vapor deposition process, the second alignment layer above can be fabricated on the first liquid crystal cell under a low temperature condition (below 120 centigrade degrees). In the case where the buffer layer includes a first photopolymer alignment layer, the display panel can adopt a self-orientated liquid crystal material to form the first photopolymer alignment layer above by light irradiation, and can complete an alignment of the liquid crystal molecules at the same time; in this way, the second alignment layer above can also be fabricated on the first liquid crystal cell under a low temperature condition (below 120 centigrade degrees).

Hereinafter, the display substrate, the display panel and the manufacturing method thereof, and the display device provided by the embodiments of the present disclosure will be described in details in conjunction with the drawings.

Figure 2:
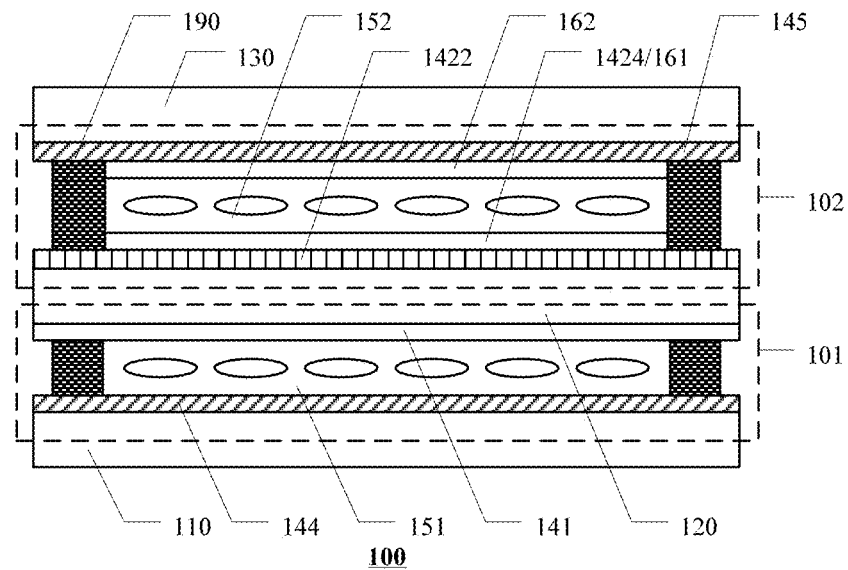
FIG. 2 is a structural diagram of another display panel provided by an embodiment of the present disclosure.

FIG. 1 is a structural diagram of a display panel provided by an embodiment of the present disclosure. FIG. 2 is a structural diagram of another display panel provided by an embodiment of the present disclosure.

As illustrated in FIG. 1 and FIG. 2, the display panel 100 includes a first display substrate 110, a second display substrate 120 and a third display substrate 130; the second display substrate 120 is assembled with the first display substrate 110 to form a first liquid crystal cell 101; the third display substrate 130 is located at a side of the second display substrate 120 away from the first display substrate 110, and the third display substrate 130 is assembled with the second display substrate 120 to form a second liquid crystal cell 102. The display panel 100 adopts a dual-liquid crystal cell structure so that it can utilize one liquid crystal cell to dynamically and regionally adjust the backlight and utilize the other liquid crystal cell to normally display an image, thereby improving the contrast of a display device adopting the display panel and achieving a thinner and lighter design at the same time.

As illustrated in FIG. 1 and FIG. 2, the display panel 100 further includes a first alignment layer 141 and a second alignment layer 142, the first alignment layer 141 is located at a side of the second display substrate 120 facing the first display substrate 110, the second alignment layer 142 is located at a side of the second display substrate 120 facing the third display substrate 130; the second alignment layer 142 includes a metal wire grid polarizer 1422 and a buffer layer 1424 located on a surface of the metal wire grid polarizer 1422 facing the third display substrate 130.

As illustrated in FIG. 1, the buffer layer 1424 can include a silicon oxide layer; alternatively, as illustrated in FIG. 2, the buffer layer 1424 can be a first photopolymer alignment layer 161.

In the display panel provided by the embodiment of the present disclosure, in the case where the second alignment layer includes a metal wire grid polarizer and a buffer layer located on a surface of the metal wire grid polarizer facing the third display substrate, on the one hand, the metal wire grid polarizer can play a role of a polarizer, and on the other hand, the metal wire grid polarizer itself has a Nano-micro periodic structure, for example, a microgroove, so that the buffer layer formed on the surface of the metal wire grid polarizer facing the third display substrate also has a Nano-microgroove with a corresponding dimension; in this way, the second alignment layer constituted by the metal wire grid polarizer and the buffer layer can serve to align the liquid crystal molecules; because both the metal wire grid polarizer and the buffer layer can be fabricated by a vapor deposition process, the second alignment layer above can be fabricated on the first liquid crystal cell under a low temperature condition (below 120 centigrade degrees). In the case where the buffer layer includes a first photopolymer alignment layer, the display panel can adopt an orientated liquid crystal material to form the first photopolymer alignment layer above by light irradiation, and can complete an alignment of the liquid crystal molecules at the same time; in this way, the second alignment layer above can also be fabricated on the first liquid crystal cell under a low temperature condition (below 120 centigrade degrees).

In some examples, the first liquid crystal cell 101 above is a display liquid crystal cell for achieving display function, and the second liquid crystal cell 102 is a dimming liquid crystal cell for controlling an intensity of backlight incident into the display liquid crystal cell depending on demands. In this way, the display panel can utilize the second liquid crystal cell 102 to regionally and dynamically adjust the backlight and utilize the first liquid crystal cell 101 to normally display an image, thereby improving a contrast of the display device adopting the display panel and achieving a lighter and thinner design at the same time. For example, the dimming liquid crystal cell can also achieve the demand of switching between a narrow viewing angle and a wide viewing angle, the demand of controlling a light intensity of different positions on the display panel, and the like. It should be explained that, the backlight above can be from a direct-lit backlight module or a side-lit backlight module, and the light emitted from the backlight module is incident into the display liquid crystal cell upon passing through the dimming liquid crystal cell so as to achieve the display function.

For example, in the case where the first liquid crystal cell 101 is a display liquid crystal cell, the first display substrate 110 can be a color filter substrate, i.e., the first display substrate can be provided with structures such as color filters; the second display substrate 120 can be a main array substrate, i.e., the second display substrate can be provided with a pixel structure and a pixel driving structure. For example, the pixel structure can include a pixel electrode; the pixel driving structure can include a thin film transistor. It should be explained that, particular configurations of the pixel structure and the pixel driving structure above can be referred to common designs, without limited in the embodiments of the present disclosure here.

For example, in the case where the second liquid crystal cell 102 is a dimming liquid crystal cell, the third display substrate 130 can be an auxiliary array substrate, i.e., the third display substrate can also be provided with a plurality of dimming units for dimming and driving structures of the dimming units; each of the dimming units can also include a dimming electrode for controlling a rotation of liquid crystals, and the driving structure of each dimming unit can include a switching element to control a dimming state of each dimming unit. For example, the switching element can include components for driving and controlling the dimming state of the plurality of dimming units, e.g., thin film transistors (TFTs) and the like; for example, the third display substrate can also be formed with a plurality of signal lines intersected with each other to define the plurality of dimming units above. The signal line above can input a voltage to the dimming electrode of each dimming unit through the switching element, so as to drive the liquid crystal molecules in the dimming liquid crystal cell to rotate.

For example, in the display panel provided by the embodiment of the present disclosure, a dimension of the pixel structure in the display liquid crystal cell can be smaller than a dimension of the dimming unit in the dimming liquid crystal cell, i.e., one dimming unit corresponds to a plurality of pixel structures, which not only achieves a pixel-based dynamic and regional light control but also avoids a considerable power consumption.

In some example, as illustrated in FIG. 1, the first liquid crystal cell 101 includes a first liquid crystal layer 151 located between the first display substrate 110 and the second display substrate 120; the second liquid crystal cell 102 includes a second liquid crystal layer 152 located between the second display substrate 120 and the third display substrate 130; the buffer layer 1424 is configured to be in contact with the second liquid crystal layer 152. Because the buffer layer applies a strong anchoring force on the liquid crystal molecules, arranging the buffer layer to be in contact with the second liquid crystal layer allows to perform an alignment to the liquid crystal molecules in a better way.

In some example, as illustrated in FIG. 1, the display panel 100 further includes a third alignment layer 143 located at a side of the third display substrate 130 facing the second display substrate 120. In this way, the second alignment layer 142 and the third alignment layer 143, together, can perform an alignment to the liquid crystal molecules so as to further improve the alignment effect.

In some example, as illustrated in FIG. 1, the display panel 100 further includes a fourth alignment layer 144 located at a side of the first display substrate 110 facing the second display substrate 129; each of the first alignment layer 141, the third alignment layer 143 and the fourth alignment layer 144 is a polyimide (PI) alignment layer. It should be explained that, before the third display substrate is assembled with the second display substrate to form the second liquid crystal cell, the third display substrate can be subject to a treatment or a process under a high temperature, thus the third alignment layer above can be fabricated by adopting a conventional alignment process and material. For example, the third alignment layer can be a PI layer. Similarly, the fourth alignment layer can also be fabricated by adopting a conventional alignment process and material. For example, the fourth alignment layer can be a PI layer.

Figure 3:
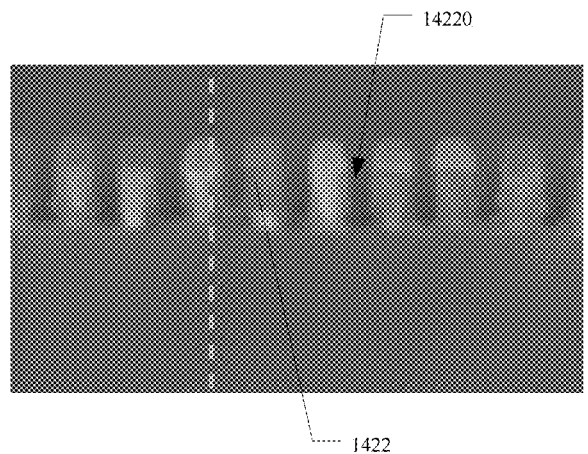
FIG. 3 is a scanning electron microscopy image of a metal wire grid polarizer in a display panel provided by an embodiment of the present disclosure.
Figure 4:
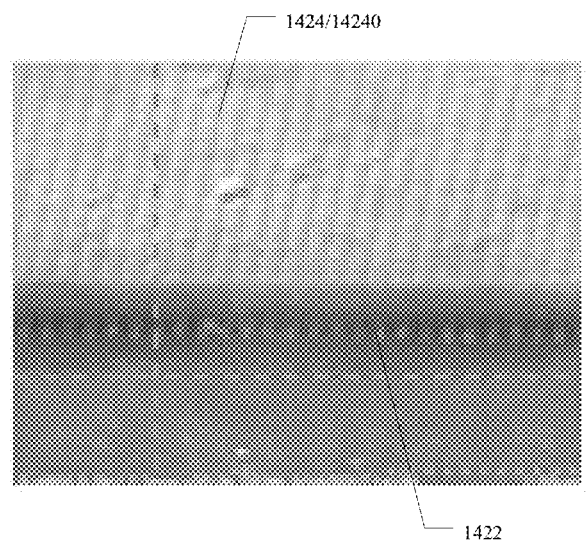
FIG. 4 is a scanning electron microscopy image of a second alignment layer in a display panel provided by an embodiment of the present disclosure.

FIG. 3 is a scanning electron microscopy image of a metal wire grid polarizer in a display panel provided by an embodiment of the present disclosure; FIG. 4 is a scanning electron microscopy image of a second alignment layer in a display panel provided by an embodiment of the present disclosure. As illustrated in FIG. 3, the metal wire grid polarizer 1422 includes a plurality of microgrooves 14220 arranged in parallel, a width of the microgroove 14220 is in a range of 45 nm-90 nm, for example, 70 nm, and a spaced distance between microgrooves 14220 is in a range of 45 nm-90 nm, for example, 70 nm.

As illustrated in FIG. 4, because the buffer layer 1424 is directly formed on a surface of the metal wire grid polarizer 1422 away from the second display substrate 120, a surface of the buffer layer 1424 away from the metal wire grid polarizer 1422 also includes a plurality of microgrooves 14240 arranged in parallel. The plurality of microgrooves 14240 can perform an alignment to the liquid crystal molecules. For example, a thickness of the metal wire grid polarizer in a direction perpendicular to the second display substrate can be in a range of 140 nm-160 nm. For example, the thickness of the metal wire grid polarizer can be 150 nm.

It should be explained that, the metal wire grid polarizer above can utilize oscillating characteristics of free electrons on a surface of the metal, so that transverse electric (TE) polarized light with an electric field direction parallel to a wire grid direction can excite the electrons to oscillate along the wire grid direction, thereby causing a reflection; while transverse electric (TE) polarized light with an electric field direction perpendicular to the wire grid direction cannot excite the electrons due to the restriction of periodic structure; as a result, the TM polarized light mainly is represented by transmittance property. That is, a light component with an electric field direction parallel to the wire grid direction is almost fully reflected by the metal wire grid polarized structure; on the contrary, most light with an electric field direction perpendicular to the wire grid direction can be transmitted through the metal wire grid polarized structure.

For example, a material of the metal wire grid polarizer can adopt aluminum, and can be formed by a film forming process and a Nano-imprinting process or a laser direct structuring process.

Figure 5:
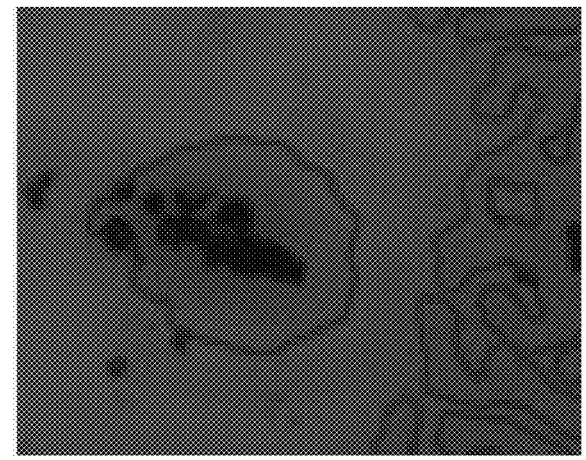
FIG. 5 is a photomicrograph illustrating an alignment performed to liquid crystal molecules by directly using a metal wire grid polarizer.
Figure 6:
FIG. 6 is a dark state diagram of a display panel which directly uses a metal wire grid polarizer as an alignment layer.
Figure 7:
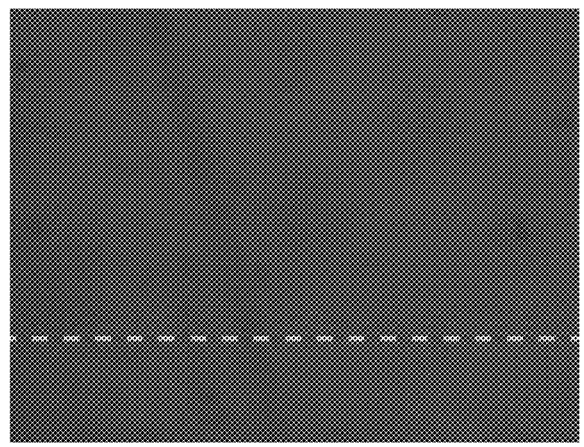
FIG. 7 is a photomicrograph illustrating an alignment performed to liquid crystal molecules by a second alignment layer provided by an embodiment of the present disclosure.
Figure 8:
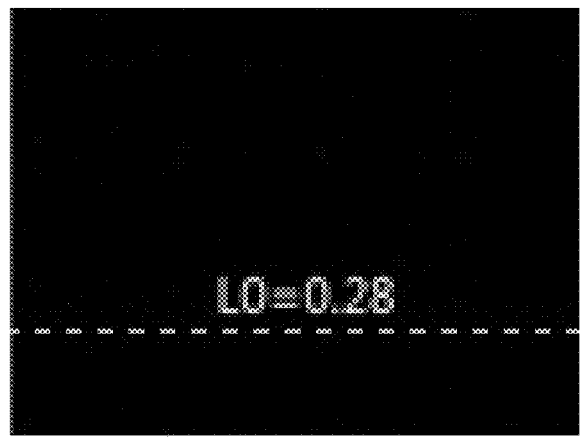
FIG. 8 is a dark state diagram of a display panel provided by an embodiment of the present disclosure.

FIG. 5 is a photomicrograph illustrating an alignment performed to liquid crystal molecules by directly using a metal wire grid polarizer; FIG. 6 is a dark state diagram of a display panel which directly uses a metal wire grid polarizer as an alignment layer; FIG. 7 is a photomicrograph illustrating an alignment performed to liquid crystal molecules by a second alignment layer provided by an embodiment of the present disclosure; FIG. 8 is a dark state diagram of a display panel provided by an embodiment of the present disclosure.

As illustrated in FIG. 5 and FIG. 6, performing an alignment to the liquid crystal molecules by directly adopting a metal wire grid polarizer leads to a poor effect, and directly using the metal wire grid polarizer as an alignment layer of the display panel achieves a high brightness in a dark state. As illustrated in FIG. 7 and FIG. 8, the embodiment of the present disclosure forms the buffer layer on the surface of the metal wire grid polarizer away from the second display substrate 120, the alignment performed to the liquid crystal molecules by the second alignment layer provided by the embodiment of the present disclosure achieves good effect, and the display panel provided by the embodiment of the present disclosure has a low brightness in the dark state.

In some examples, the buffer layer above is fabricated by adopting a material which has a high transmittance and applies a strong anchoring force on the liquid crystal molecules.

For example, the buffer layer above is a silicon oxide layer. Of course, the embodiment of the present disclosure includes such case but is not limited thereto, and the buffer layer above can also be fabricated by adopting a silicon nitride material or a silicon oxynitride material.

In some examples, a thickness of the silicon oxide above is in a range of 200 nm-600 nm; within this thickness range, a surface of the buffer layer can be formed with microgrooves in a better way because of the periodic structure of the wire grid below the surface, so as to maintain a high transmittance and meanwhile applying a strong anchoring force on the liquid crystal molecules. In some examples, the thickness of the silicon oxide above is about 250 nm, so as to achieve a high light transmittance.

For example, given that a width of the microgroove on the metal wire grid polarizer and a spaced distance between the microgrooves both are 70 nm, that the thickness of the metal wire grid polarizer is 153 nm, and that an optical adhesive (having a thickness of 2000 nm) is selected as the buffer layer, a light transmittance (the light transmittance is 28%) of the metal wire grid polarizer and the optical adhesive, as a whole, is reduced more or less, as compared to that (e.g., the light transmittance is 41.7%, and the degree of polarization is 99.4%) of the metal wire grid polarizer alone. In the case where a combined layer of optical adhesive and silicon oxide is selected as the buffer layer, and upon the silicon oxide being located between the optical adhesive layer and the metal wire grid polarizer, the light transmittance (the light transmittance is 30.3%) of the metal wire grid polarizer and the optical adhesive, as a whole, is reduced more or less, as compared to that (e.g., the light transmittance is 41.7%, and the degree of polarization is 99.4%) of the metal wire grid polarizer alone. In the case where a combined layer of optical adhesive and silicon oxide is selected as the buffer layer, and upon the optical adhesive layer being located between the silicon oxide layer and the metal wire grid polarizer, the light transmittance (the light transmittance is 28.3%) of the metal wire grid polarizer and the optical adhesive, as a whole, is reduced more or less, as compared to that (e.g., the light transmittance is 41.7%, and the degree of polarization is 99.4%) of the metal wire grid polarizer alone. In the case where the silicon oxide is selected as the buffer layer, and after the metal wire grid polarizer thereon is formed with silicon oxide having a thickness greater than 200 nm (e.g., 250 nm) by a vapor deposition process, the light transmittance and the degree of polarization (e.g., the light transmittance is 41.7%, and the degree of polarization is 99.4%) of the metal wire grid polarizer and the silicon oxide, as a whole, remain substantially unchanged, as compared to that (e.g., the light transmittance is 41.7%, and the degree of polarization is 99.4%) of the metal wire grid polarizer alone. As it can be seen, by selecting silicon oxide as the buffer layer, it can not only achieve a good alignment effect, but also achieve a high transmittance and a high degree of polarization of the metal wire grid polarizer and the silicon oxide, as a whole.

In some examples, as illustrated in FIG. 2, the display panel 100 further includes a second photopolymer alignment layer 162, the second photopolymer alignment layer 162 is located at a side of the third display substrate 130 facing the second display substrate 120; the above-mentioned first photopolymer alignment layer 161 and second photopolymer alignment layer 162 both are formed by polymerizing an orientation monomer through light irradiation. In this way, the first photopolymer alignment layer 161 and the second photopolymer alignment layer 162, together, can perform an alignment to the liquid crystal molecules, and the second photopolymer alignment layer 162 can be formed by photopolymerization and can be formed under a low temperature condition (below 120 centigrade degrees).

In some examples, as illustrated in FIG. 2, the first liquid crystal cell 101 includes a first liquid crystal layer 151 located between the first display substrate 110 and the second display substrate 120; the second liquid crystal cell 102 includes a second liquid crystal layer 152 located between the second display substrate 120 and the third display substrate 130. The second liquid crystal layer 152 can include a self-orientated liquid crystal material. Therefore, upon the first liquid crystal cell being assembled, the first liquid crystal cell can be directly assembled with the third display substrate to form a cell, then the self-orientated liquid crystal material is subject to a process (e.g., light irradiation) so that the self-orientated liquid crystal material can be self-orientated and form the first photopolymer alignment layer above. As it can be seen, in the display panel, an alignment of the liquid crystal molecules can be completed under a low temperature condition (below 120 centigrade degrees).

In some examples, the self-orientated liquid crystal material above includes a liquid crystal molecule and an orientation monomer. The orientation monomer can be polymerized through light irradiation, so as to complete the alignment of the liquid crystal molecules and to form the first photopolymer alignment layer above.

In some examples, as illustrated in FIG. 2, the display panel 100 above further includes a fourth alignment layer 144 located between the second photopolymer alignment layer 162 and the third display substrate 130; the fourth alignment layer 144 can play a role of pre-aligning the liquid crystal molecules before the first photopolymer alignment layer and the second photopolymer alignment layer are formed. It should be explained that, because the third display substrate can be subject to a treatment or process under a high temperature before the third display substrate is assembled with the second display substrate to form the second liquid crystal cell, the fourth alignment layer above can be fabricated by adopting a conventional alignment process and material. For example, the fourth alignment layer can be a PI layer.

In some examples, as illustrated in FIG. 1 and FIG. 2, the display panel 100 above further includes a fifth alignment layer 145 located at a side of the first display substrate 110 close to the second display substrate 120.

In some examples, as illustrated in FIG. 1 and FIG. 2, the display panel 100 further includes a sealant 190 configured to seal the first liquid crystal layer 151 between the first display substrate 110 and the second display substrate 120, or to seal the second liquid crystal 152 between the second display substrate 120 and the third display substrate 130.

For example, as illustrated in FIG. 2, orthographic projections of the first photopolymer alignment layer 161 and the second photopolymer alignment layer 162 on the second display substrate 120 are located within an orthographic projection of the sealant 190 on the second display substrate 120.

An embodiment of the present disclosure further provides a manufacturing method of a display panel. The manufacturing method of the display panel includes: assembling the first display substrate with the second display substrate to form a first liquid crystal cell; and assembling the second display substrate with the third display substrate to form a second liquid crystal cell. The manufacturing method further includes: forming a first alignment layer at a side of the second display substrate facing the first display substrate; and forming a second alignment layer at a side of the second display substrate facing the third display substrate; the second alignment layer includes a metal wire grid polarizer and a buffer layer located on a surface of the metal wire grid polarizer facing the third display substrate. For example, the buffer layer above can be a silicon oxide layer or a first photopolymer alignment layer.

In the manufacturing method of the display panel provided by the embodiment of the present disclosure, in the case where the second alignment layer includes a metal wire grid polarizer and a buffer layer located on a surface of the metal wire grid polarizer facing the third display substrate, on the one hand, the metal wire grid polarizer can play a role of a polarizer, and on the other hand, the metal wire grid polarizer itself has a Nano-micro periodic structure so that the buffer layer formed on the surface of the metal wire grid polarizer facing the third display substrate also has a Nano-microgroove with a corresponding dimension; in this way, the second alignment layer constituted by the metal wire grid polarizer and the buffer layer can serve to align the liquid crystal molecules; because both the metal wire grid polarizer and the buffer layer can be fabricated by a vapor deposition process, the second alignment layer above can be fabricated on the first liquid crystal cell under a low temperature condition (below 120 centigrade degrees). In the case where the second alignment layer includes a first photopolymer alignment layer, the display panel can adopt a self-orientated liquid crystal material and form the first photopolymer alignment layer above through light irradiation, and can complete an alignment of the liquid crystal molecules at the same time; in this way, the second alignment layer above can also be fabricated on the first liquid crystal cell under a low temperature condition (below 120 centigrade degrees).

In some examples, forming the second alignment layer at the side of the second display substrate facing the third display substrate includes: after assembling the first display substrate with the second display substrate to form the first liquid crystal cell, forming the metal wire grid polarizer at a side of the second display substrate away from the first display substrate; and forming a silicon oxide layer at a side of the metal wire grid polarizer away from the first display substrate; the silicon oxide layer is the buffer layer above. Because both the metal wire grid polarizer and the buffer layer can be fabricated by adopting a vapor deposition process, the second alignment layer above can be fabricated on the first liquid crystal cell under a low temperature condition (below 120 centigrade degrees). For example, in the case where the buffer layer is a silicon oxide layer, a vapor deposition process can be performed by using SiH4 and N2O under a pressure of 1000 Torr, at a flow rate of 550 mil, so as to form a silicon oxide layer, in which a quantity of flow of SiH4 and N2O can be 120 sccm and 1800 sccm, respectively; of course, the vapor deposition process can also be performed by using SiH4, N2 and N2O under a pressure of 1200 Torr, at a flow rate of 710 mil, so as to form the silicon oxide layer, in which a quantity of flow of SiH4, N2 and N2O can be 50 sccm, 500 sccm and 1800 sccm, respectively. In some examples, forming the metal wire grid polarizer at the side of the second display substrate away from the first display substrate and forming the buffer layer at the side of the metal wire grid polarizer away from the first display substrate are performed at a fabrication temperature below 120 centigrade degrees. For example, a metal layer can be formed at a side of the second display substrate away from the first display substrate by a vapor deposition process, then the metal layer can be patterned by an etching process to form the metal wire grid polarizer, and then the buffer layer can be formed at a side of the metal wire grid polarizer away from the first display substrate by a vapor deposition process, so as to fabricate the second alignment layer above on the first liquid crystal cell under a low temperature condition (below 120 centigrade degrees). Of course, the embodiments of the present disclosure include such case but are not limited thereto, and the above-described metal wire grid polarizer and buffer layer can also be fabricated by adopting other processes, as long as the fabrication temperature is below 120 centigrade degrees.

In some examples, assembling the first display substrate with the second display substrate to form the first liquid crystal cell includes: forming a first liquid crystal layer between the first display substrate and the second display substrate. Assembling the second display substrate with the third display substrate to form the second liquid crystal cell includes: forming a second liquid crystal layer between the second display substrate and the third display substrate; the buffer layer is arranged to be in contact with the second liquid crystal layer. Because the buffer layer applies a strong anchoring force on the liquid crystal molecules, by arranging the buffer layer to be in contact with the second liquid crystal layer, the liquid crystal molecules can be aligned in a better way.

For example, the liquid crystal material can be injected between the first display substrate and the second display substrate to form the first liquid crystal layer above, and can be injected between the second display substrate and the third display substrate to form the second liquid crystal layer above, by an One Drop Filling (ODF) process.

In some examples, assembling the second display substrate with the third display substrate to form the second liquid crystal cell includes: assembling the second display substrate with the third display substrate to form a cell; injecting a self-orientated liquid crystal material between the second display substrate and the third display substrate; and irradiating the second liquid crystal cell by using first ultraviolet (UV) light so that an orientation monomer in the self-orientated liquid crystal material forms a first photopolymer alignment layer at a side of the second display substrate facing the third display substrate, and forms a second photopolymer alignment layer at a side of the third display substrate facing the second display substrate; the first photopolymer alignment layer above can be the buffer layer above. Thus, the self-orientated liquid crystal material can be irradiated with first UV light so as to be aligned and to form the above-described first photopolymer alignment layer and second photopolymer alignment layer. In this way, the above-described first photopolymer alignment layer and second photopolymer alignment layer can be formed under a low temperature condition (below 120 centigrade degrees).

For example, the first UV light can be polarized UV light. Of course, the embodiments of the present disclosure include such case but are not limited thereto, and the first UV light can be UV light of other types.

For example, a wavelength of the first UV light above can be about 254 nm; an illumination of the first UV light above can be in a range of 2000 mj-10000 mj; and an intensity of the UV light above can be in a range of 100 mw/cm$^2$-200 mw/cm$^2$.

In some examples, the manufacturing method further includes: before irradiating the self-orientated liquid crystal material by using the first UV light, heating the self-orientated liquid crystal material so that a temperature of the self-orientated liquid crystal material is greater than or equal to a clearing point of the self-orientated liquid crystal material plus 10 centigrade degrees, thereby achieving self-alignment in a better way.

For example, the second liquid crystal cell can be heated by using a metal lamp, for example, it can be heated to reach 105 centigrade degrees; for example, a power of the metal lamp is 160 mw, and an illumination of the metal lamp is about 7500 mj.

In some examples, the manufacturing method further includes: irradiating the second liquid crystal cell by using second UV light so as to completely remove the remaining orientation monomer from the second liquid crystal cell, thereby improving the display quality of the display panel.

For example, a wavelength of the second UV light above is about 365 nm; an illumination of the second UV light above is about 10 mw; and an irradiation duration of the second UV light above is in a range of 10 minutes-30 minutes.

Figure 9:
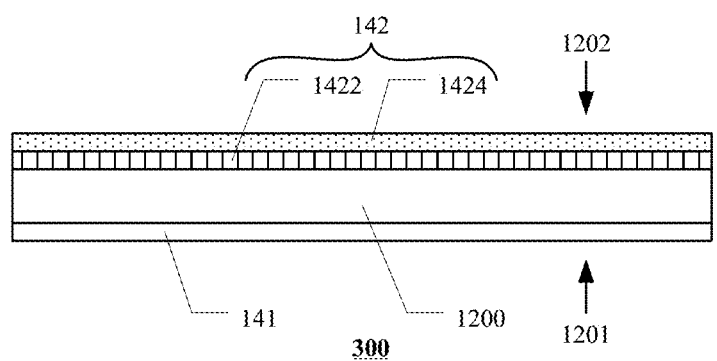
FIG. 9 is a structural diagram of a display substrate provided by an embodiment of the present disclosure.

An embodiment of the present disclosure further provides a display substrate. FIG. 9 is a structural diagram of a display substrate provided by an embodiment of the present disclosure; and FIG. 10 is a structural diagram of another display substrate provided by an embodiment of the present disclosure.

Figure 10:
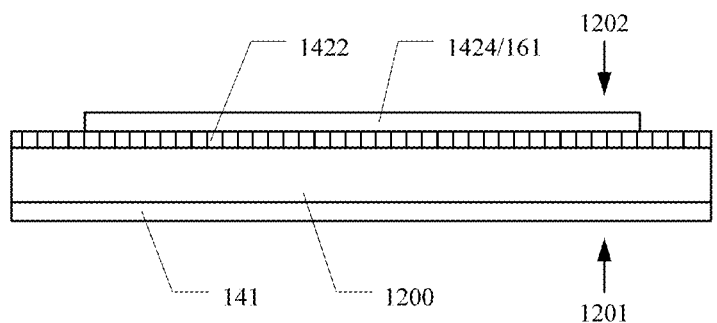
FIG. 10 is a structural diagram of another display substrate provided by an embodiment of the present disclosure.

As illustrated in FIG. 9 and FIG. 10, the display substrate 300 includes a base substrate 1200 having a first side 1201 and a second side 1202 opposite to each other; a first alignment layer 141 located at the first side 1201 of the base substrate 1200; and a second alignment layer 142 located at the second side 1202 of the base substrate 1200. As illustrated in FIG. 9, the second alignment layer 142 includes a metal wire grid polarizer 1422 and a buffer layer 1424 located on a surface of the metal wire grid polarizer 1422 facing the third display substrate 130. As illustrated in FIG. 10, the second alignment layer 142 includes the first photopolymer alignment layer 161.

The display substrate provided by the embodiment of the present disclosure is provided with an alignment layer at both sides thereof, so as to be assembled with two other display substrates at the same time to constitute a dual-liquid crystal cell structure, thereby improving the contrast of a display device adopting the display panel and achieving a lighter and thinner design at the same time. In the case where the second alignment layer includes a metal wire grid polarizer and a buffer layer located on a surface of the metal wire grid polarizer facing the third display substrate, on the one hand, the metal wire grid polarizer can play a role of a polarizer, and on the other hand, the metal wire grid polarizer itself has a Nano-micro periodic structure such as a microgroove so that the buffer layer formed on the surface of the metal wire grid polarizer facing the third display substrate also has a Nano-microgroove with a corresponding dimension; in this way, the second alignment layer constituted by the metal wire grid polarizer and the buffer layer can serve to align the liquid crystal molecules; because both the metal wire grid polarizer and the buffer layer can be fabricated by a vapor deposition process, the second alignment layer above can be fabricated on the first liquid crystal cell under a low temperature condition (below 120 centigrade degrees). In the case where the second alignment layer includes a first photopolymer alignment layer, a display panel including the display substrate can adopt a self-orientated liquid crystal material to form the first photopolymer alignment layer above through light irradiation, and can complete an alignment of the liquid crystal molecules at the same time; in this way, the second alignment layer above can also be fabricated on a liquid crystal cell under a low temperature condition (below 120 centigrade degrees).

It should be explained that, the base substrate provided by the present embodiment can be the second display substrate in the display panel provided by the embodiments above, and the second alignment layer above can also be the second alignment layer in the display panel provided by the embodiments above; therefore, the specific structure of the second alignment layer can also be referred to that in the second display substrate provided by the embodiments above, and the repeated portions are omitted herein.

An embodiment of the present disclosure further provides a display device. The display device includes the display panel above. In this way, the display device can achieve the fabrication of the second alignment layer above on the first liquid crystal cell under a low temperature condition (below 120 centigrade degrees), so as to constitute a dual-liquid crystal cell structure, thereby improving the contrast and achieving a thinner and lighter design at the same time.

For example, the display device can be a large-sized display device, for example, a television, an electronic frame and the like. Of course, the embodiments of the present disclosure include such case but are not limited thereto, and the display device can also be an electronic product with display function, for example, a desktop computer, a notebook computer, a smart phone, a tablet computer, a navigator and the like.

What have been described above are only exemplary implementations of the present disclosure, but the protection scope of the present disclosure is not limited thereto. Any modification or substitution easily conceivable for those ordinary skilled who are familiar with the related art should be covered by the protection scope of the present disclosure. Therefore, the protection scope of the present disclosure should be determined based on the appended claims.

What is claimed is:

1. A display panel, comprising:
   a first display substrate;
   a second display substrate, the second display substrate being assembled with the first display substrate to form a first liquid crystal cell;
   a third display substrate located at a side of the second display substrate away from the first display substrate, the third display substrate being assembled with the second display substrate to form a second liquid crystal cell; and
   a first alignment layer, located at a side of the second display substrate facing the first display substrate,
   wherein the display panel further comprises a second alignment layer located at a side of the second display substrate facing the third display substrate;
   the second alignment layer comprises a metal wire grid polarizer and a buffer layer, the metal wire grid polarizer comprises a plurality of first microgrooves arranged in parallel with each other, and the buffer layer is a single layer and is directly located on a surface of the metal wire grid polarizer facing the third display substrate,
   a surface of the buffer layer away from the metal wire grid polarizer comprises a plurality of second micro grooves arranged in parallel with each other, the plurality of first micro grooves and the plurality of second micro grooves are arranged in one-to-one correspondence.

2. The display panel according to claim 1, wherein the buffer layer comprises a first photopolymer alignment layer.

3. The display panel according to claim 1, wherein the first liquid crystal cell comprises a first liquid crystal layer located between the first display substrate and the second display substrate, the second liquid crystal cell comprises a second liquid crystal layer located between the second display substrate and the third display substrate, and the buffer layer is arranged to be in contact with the second liquid crystal layer.

4. The display panel according to claim 1, wherein the buffer layer comprises a silicon oxide layer, and a thickness of the silicon oxide layer is in a range of 200 nm-600 nm.

5. The display panel according to claim 4, wherein the display panel further comprises:
   a third alignment layer, located at a side of the third display substrate facing the second display substrate; and
   a fourth alignment layer, located at a side of the first display substrate facing the second display substrate,
   wherein each of the first alignment layer, the third alignment layer and the fourth alignment layer is a polyimide (PI) alignment layer.

6. The display panel according to claim 1, wherein the second alignment layer comprises a first photopolymer alignment layer,
   the display panel further comprises a second photopolymer alignment layer located at a side of the third display substrate facing the second display substrate, and
   the first photopolymer alignment layer and the second photopolymer alignment layer both are formed by polymerizing an orientation monomer through light irradiation.

7. The display panel according to claim 6, wherein the first liquid crystal cell comprises a first liquid crystal layer located between the first display substrate and the second display substrate,
   the second liquid crystal cell comprises a second liquid crystal layer located between the second display substrate and the third display substrate, and
   the second liquid crystal layer comprises a self-orientated liquid crystal material.

8. The display panel according to claim 7, wherein the self-orientated liquid crystal material comprises a liquid crystal molecule and an orientation monomer.

9. The display panel according to claim 6, wherein the display panel further comprises:
   a fourth alignment layer, located at a side of the first display substrate facing the second display substrate; and a fifth alignment layer, located between the second photopolymer alignment layer and the third display substrate,
wherein each of the first alignment layer, the fourth alignment layer and the fifth alignment layer is a polyimide (PI) alignment layer.

10. The display panel according to claim 1, wherein the first liquid crystal cell is a display liquid crystal cell, and the second liquid crystal cell is a dimming liquid crystal cell.

11. A display device, comprising the display panel according to claim 1.

12. A manufacturing method of a display panel, comprising:
assembling a first display substrate with a second display substrate to form a first liquid crystal cell; and
assembling the second display substrate with a third display substrate to form a second liquid crystal cell,
wherein the manufacturing method of the display panel further comprises:
forming a first alignment layer at a side of the second display substrate facing the first display substrate; and
forming a second alignment layer at a side of the second display substrate facing the third display substrate,
the second alignment layer comprises a metal wire grid polarizer and a buffer layer, the metal wire grid polarizer comprises a plurality of first microgrooves arranged in parallel with each other, and the buffer layer is a single layer and is directly located on a surface of the metal wire grid polarizer facing the third display substrate,
a surface of the buffer layer away from the metal wire grid polarizer comprises a plurality of second micro grooves arranged in parallel with each other, the plurality of first micro grooves and the plurality of second micro grooves are arranged in one-to-one correspondence.

13. The manufacturing method according to claim 12, wherein forming the second alignment layer at the side of the second display substrate facing the third display substrate comprises:
after assembling the first display substrate with the second display substrate to form the first liquid crystal cell, forming the metal wire grid polarizer at a side of the second display substrate away from the first display substrate; and
forming a silicon oxide layer at a side of the metal wire grid polarizer away from the first display substrate, the silicon oxide layer being the buffer layer.

14. The manufacturing method according to claim 13, wherein forming the metal wire grid polarizer at the side of the second display substrate away from the first display substrate and forming the silicon oxide layer at the side of the metal wire grid polarizer away from the first display substrate are performed at a fabrication temperature below 120 centigrade degrees.

15. The manufacturing method according to claim 14, wherein assembling the first display substrate with the second display substrate to form the first liquid crystal cell comprises: forming a first liquid crystal layer between the first display substrate and the second display substrate,
assembling the second display substrate with the third display substrate to form the second liquid crystal cell comprises: forming a second liquid crystal layer between the second display substrate and the third display substrate,
wherein the buffer layer and the second liquid crystal layer are arranged to be in contact with each other.

16. The manufacturing method according to claim 12, wherein assembling the second display substrate with the third display substrate to form the second liquid crystal cell comprises:
assembling the second display substrate with the third display substrate to form a cell;
injecting a self-orientated liquid crystal material between the second display substrate and the third display substrate; and
irradiating the self-orientated liquid crystal material by using first ultraviolet (UV) light to allow an orientation monomer in the self-orientated liquid crystal material to form a first photopolymer alignment layer at a side of the second display substrate facing the third display substrate, and to form a second photopolymer alignment layer at a side of the third display substrate facing the second display substrate,
wherein the first photopolymer alignment layer is the buffer layer.

17. The manufacturing method according to claim 16, further comprising:
before irradiating the self-orientated liquid crystal material by using the first ultraviolet light, heating the self-orientated liquid crystal material to make a temperature of the self-orientated liquid crystal material higher than a clearing point of the self-orientated liquid crystal material by more than 10 centigrade degrees.

18. The manufacturing method according to claim 16, further comprising: irradiating the second liquid crystal cell by using second ultraviolet light so as to completely remove the orientation monomer remained in the second liquid crystal cell.

19. A display substrate, comprising:
a base substrate, having a first side and a second side opposite to each other;
a first alignment layer, located at the first side of the base substrate; and
a second alignment layer, located at the second side of the base substrate,
wherein the second alignment layer comprises a metal wire grid polarizer and a buffer layer, the metal wire grid polarizer comprises a plurality of first microgrooves arranged in parallel with each other, and the buffer layer is a single layer and is directly located on a surface of the metal wire grid polarizer away from the base substrate, the buffer layer comprises a silicon oxide layer or a photopolymer alignment layer,
a surface of the buffer layer away from the metal wire grid polarizer comprises a plurality of second micro grooves arranged in parallel with each other, the plurality of first micro grooves and the plurality of second micro grooves are arranged in one-to-one correspondence.

* * * * *